Figure 1:
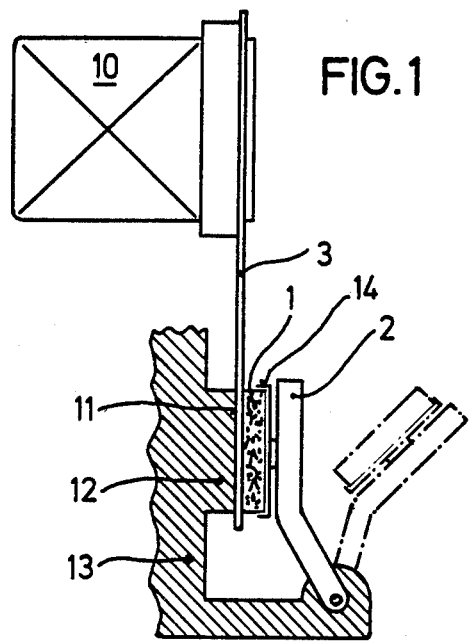

United States Patent [19]

Knerich et al.

[11] 4,320,429
[45] Mar. 16, 1982

[54] PRESSURE DEVICE FOR FLEXIBLE RECORDING MEDIA IN CARTRIDGES USING A UNIVERSAL JOINT MOUNTING

[75] Inventors: Werner Knerich, Willstätt; Udo Boehm; Klaus Schulze-Berge, both of Ludwigshafen; Roland Brotzler, Hochdorf-Assenheim, all of Fed. Rep. of Germany

[73] Assignee: BASF Aktiengesellschaft, Ludwigshafen, Fed. Rep. of Germany

[21] Appl. No.: 113,096

[22] Filed: Jan. 17, 1980

[30] Foreign Application Priority Data

Feb. 5, 1979 [DE] Fed. Rep. of Germany ....... 7903031

[51] Int. Cl.³ .............................................. G11B 15/60
[52] U.S. Cl. ........................... 360/130.34; 360/130.3; 360/130.32
[58] Field of Search ........... 360/130.3, 130.31, 130.32, 360/130.34, 99, 128

[56] References Cited

U.S. PATENT DOCUMENTS 3,678,481  7/1972  Dalziel et al. .......................... 360/99

OTHER PUBLICATIONS

Hanson, et al., "Diskette. . . Assembly", IBM Tech. Disc. Bull., vol. 19, No. 9, Feb. 1977, pp. 3546-3548.

*Primary Examiner*—Robert S. Tupper
*Attorney, Agent, or Firm*—Keil & Witherspoon

[57] ABSTRACT

A pressure device for flexible recording media, especially those contained in cartridges, which comprises a rigid member provided with a resilient pad, which member, secured to a pivoted lever, is located in front of the write/read area of the scanning head relative to the direction of rotation of the recording medium, and presses the recording medium against a platen, wherein the rigid member is connected to the pivoted lever via a universal joint.

3 Claims, 4 Drawing Figures

PRESSURE DEVICE FOR FLEXIBLE RECORDING MEDIA IN CARTRIDGES USING A UNIVERSAL JOINT MOUNTING

The present invention relates to a pressure device for flexible recording media, especially those contained in cartridges, which comprises a rigid member provided with a resilient pad, which member is arranged on a pivoted lever which can be urged toward a platen portion on the chassis of the drive unit for the recording medium, and is located in front of the write/read area of the scanning head relative to the direction of rotation of the flexible recording medium, and thus presses the recording medium, at least indirectly, against said platen portion.

A pressure device of this type is known from U.S. Pat. No. 3,678,481, wherein a foam rubber pressure pad is fixedly connected to a lever arm which can be actuated by means of a solenoid. When the lever arm is actuated, the pressure pad is pressed against the cover of the disk cartridge. Apart from the fact that the rotation of the recording medium is stabilized, the recording medium is cleaned, before the write/read head comes into action, by the layer of cleaning material on the inner surface of the cartridge, which is pressed against the recording medium by the pressure pad.

The rigid arrangement of the pressure pad on the lever arm has proved a disadvantage in practice, being detrimental both to the recording medium and to the write and read operations.

It is an object of the present invention to provide a pressure device which does not have the disadvantages of the prior art devices and which enables a definite surface pressure to be applied directly or indirectly to the recording medium.

This object is achieved with a pressure device for flexible recording media, especially those contained in cartridges, which comprises a rigid member provided with a resilient pad, which member is arranged on a pivoted arm which can be urged toward a platen portion on the chassis of the drive unit for the recording medium, and is located in front of the write/read area of the scanning head relative to the direction of rotation of the flexible recording medium, and thus presses the recording medium, at least indirectly, against said platen portion, wherein the rigid member is jointedly mounted in order to achieve the application of pressure over the entire surface of the resilient pad.

As a result, the application of pressure at a single point or linearly, which may occur in the case of the prior art devices, is avoided.

In an advantageous embodiment of the invention, the rigid member is mounted on a universal joint. This allows movement of the rigid member, carrying the resilient pad, in all directions, so that even under unfavorable conditions a uniform definite surface pressure urges the recording medium against the platen portion, thereby minimizing wear of the recording medium, whilst ensuring satisfactory cleaning of that area of the medium which is immediately in front of the head.

In a practical embodiment, a ball with a pin is provided on the rigid member, and a socket, communicating with a hole, on the pivoted lever. This enables the unit to be produced simply and cheaply.

In a further advantageous embodiment, means are provided for preventing the rigid member from rotating with respect to the pivoted arm, so that the pad substantially registers with the platen portion.

Figure 2A:
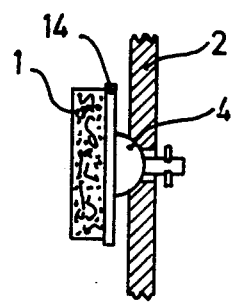
Figure 2B:
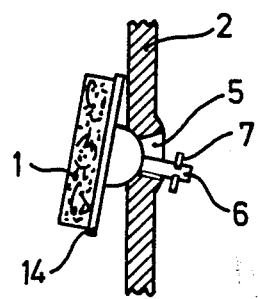
Figure 3:
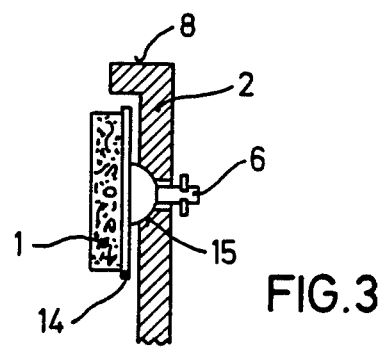
Figure 4:
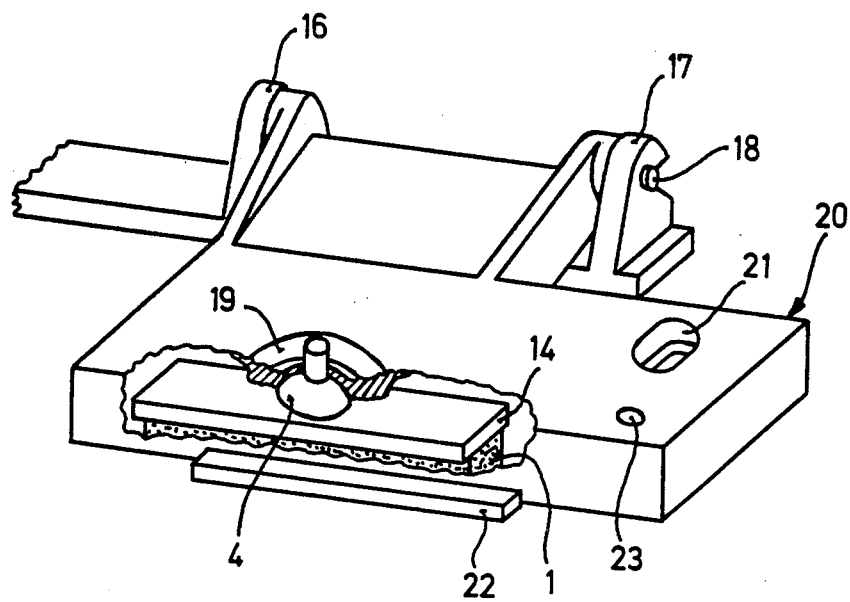

Further details of the invention are disclosed in the following description of the embodiments illustrated in the accompanying drawings, in which FIG. 1 shows the basic principle of a pressure device in a flexible disk drive, FIGS. 2a and 2b show a design according to the invention, employing a universal joint, FIG. 3 shows a further embodiment of the pivoted lever, and FIG. 4 is a perspective view, partly broken away, of the assembled device.

A processing unit for flexible magnetic disks, i.e. floppy disks, consists essentially of a drive mechanism 10 and a device for positioning the magnetic head (not shown) above the recording medium, in its cartridge 3. Facing the surface 11 of the platen 12, which is shown as part of the chassis 13 of the disk drive, and on the opposite side of the cartridge 3, there is arranged a flexible pad 1 which is, for example, right parallelepipedal in shape, and is fastened to a rigid plate 14. Plate 14 is, in turn, secured to a pivoted lever 2 hinged to the chassis of the disk drive, which lever can be pivoted approximately through the angular range indicated by the two positions shown in FIG. 1.

The size of the rigid plate 14 approximately corresponds to that of the surface 11. FIGS. 2a, 2b and 3 show how the plate 14 is connected to the pivoted lever 2 in accordance with the invention. FIG. 2a shows the plate 14 in its initial position, with the pad 1 parallel to the surface 11. A ball or hemispherical member 4 is located in a socket 15 of corresponding shape, the socket being formed in the pivoted lever 2 and communicating with a hole 5.

On the hemispherical member 4, and at right angles to the surface of the plate 14, there is provided a pin 6 which cooperates with hole 5 and, in conjunction with the edges of plate 14, determines the degree of movement of the plate 14. FIG. 2b shows the plate 14 in an extreme position, in which an edge of the plate and the pin abut against the pivoted lever 2 and the side of the hole respectively and hence limit pivotal movement of the plate 14. To prevent the pin 6 from dropping out of the hole in the lever 2, a retaining washer 7 is suitably fixed, for example by a force fit, on the end of the pin 6 which passes through the lever 2. FIG. 3 shows an embodiment of the pivoted lever 2, which has a shoulder 8 to prevent plate 14 from rotating with respect to lever 2. FIG. 4 shows the complete pivoted lever and its mounting, in perspective. Lever 20 is swingably mounted on bearing members 16 and 17 by means of pivots 18. The lever is shown broken away at the bowl-shaped depression 19 to reveal the pressure plate 14 with the hemispherical member 4, pin 6 and pad 1. A hole 21 receives the end of a further lever, not shown, which operates the lever 2 and may for example be actuated by an electromagnet. A hole 23 receives one end of a compression spring, which is not shown, and the other end of which bears against the chassis 13 of the disk drive. The projection 22 at the front of the lever 20 is intended to bear constantly against the head carriage (which is not shown), so that, when the disk drive is in the unloaded condition, the magnetic head is kept at a specific distance from the chassis and from the opposite magnetic head by the said compression spring.

With the exception of the retaining washer 7 and the resilient pad 1, which pad can for example consist of foam rubber, felt or the like, the components of the device are advantageously plastic injection moldings.

We claim:

1. A pressure device for flexible recording media contained in cartridges, which comprises a rigid member provided with a resilient pad, which member is arranged on a pivoted arm which can be urged toward a platen portion on the chassis of the drive unit for the recording medium, and is located in front of the write/read area of the scanning head relative to the direction of rotation of the flexible recording medium, and thus presses the recording medium, at least indirectly, against said platen portion, wherein the rigid member is mounted by means of a universal joint, in order to achieve the application of pressure over the entire surface of the resilient pad.

2. A device as claimed in claim 1, wherein a ball with a pin is provided on the rigid member, and a socket, communicating with a hole, is provided on the pivoted lever.

3. A device as claimed in claim 1 or 2, wherein means are provided for preventing the rigid member from rotating with respect to the pivoted lever.

* * * * *